United States Patent [19]

Huebner

[11] Patent Number: 4,989,765
[45] Date of Patent: Feb. 5, 1991

[54] VEHICULAR CARRIER APPARATUS

[76] Inventor: Jerry J. Huebner, 324 E. Summitt Ave., P.O. Box 634, Ellsworth, Wis. 54011

[21] Appl. No.: 427,530

[22] Filed: Oct. 27, 1989

[51] Int. Cl.⁵ .......................... B60R 9/00; B62D 43/00
[52] U.S. Cl. ................................ 224/42.07; 224/42.06
[58] Field of Search ............... 224/42.07, 42.01, 42.06, 224/42.03 A, 42.03 B, 42.03 R, 42.08, 42.12, 42.16, 42.33, 42.13, 42.15, 42.19, 42.21, 42.24, 42.43, 42.44; 414/462, 463; 280/769

[56] References Cited

U.S. PATENT DOCUMENTS

| | | | |
|---|---|---|---|
| 1,179,823 | 4/1916 | Greene | 224/42.21 |
| 1,606,954 | 11/1926 | Moen et al. | 224/42.13 |
| 1,808,042 | 6/1931 | Kennedy | 224/42.21 |
| 1,906,920 | 5/1933 | Sheffer | 224/42.07 |
| 3,521,799 | 7/1970 | Rundel | 224/42.07 |
| 3,690,526 | 9/1972 | Rundel | 224/42.07 |
| 3,937,375 | 2/1976 | Daniels | 224/42.07 |
| 4,099,760 | 7/1978 | Mascotte et al. | 224/42.08 |

FOREIGN PATENT DOCUMENTS 565198 10/1958 Belgium .............. 224/42.13

Primary Examiner—Henry J. Recla
Assistant Examiner—David J. Walczak
Attorney, Agent, or Firm—Leon Gilden

[57] ABSTRACT

A vehicular carrier apparatus utilizes a vertical and/or horizontal support grid individually or in combination relative to one another for securement to a forward portion of an associated vehicle. The horizontal carrier includes a plurality of support beams with an overlying series of mounting plates thereon to define a cradle structure wherein the vertical support member includes mounting for a spare tire relative to the organization and further, wherein the vertical and horizontal support organizations may be secured together selectively.

6 Claims, 4 Drawing Sheets

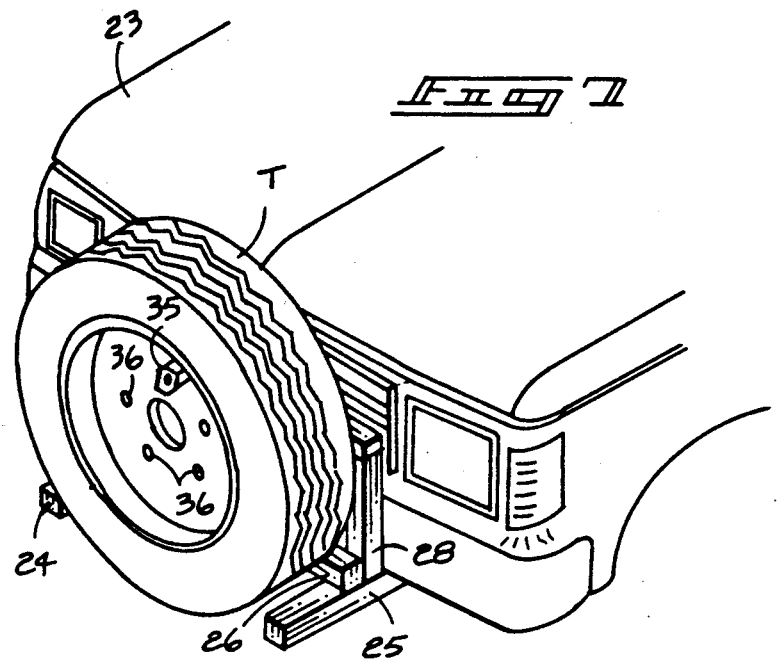
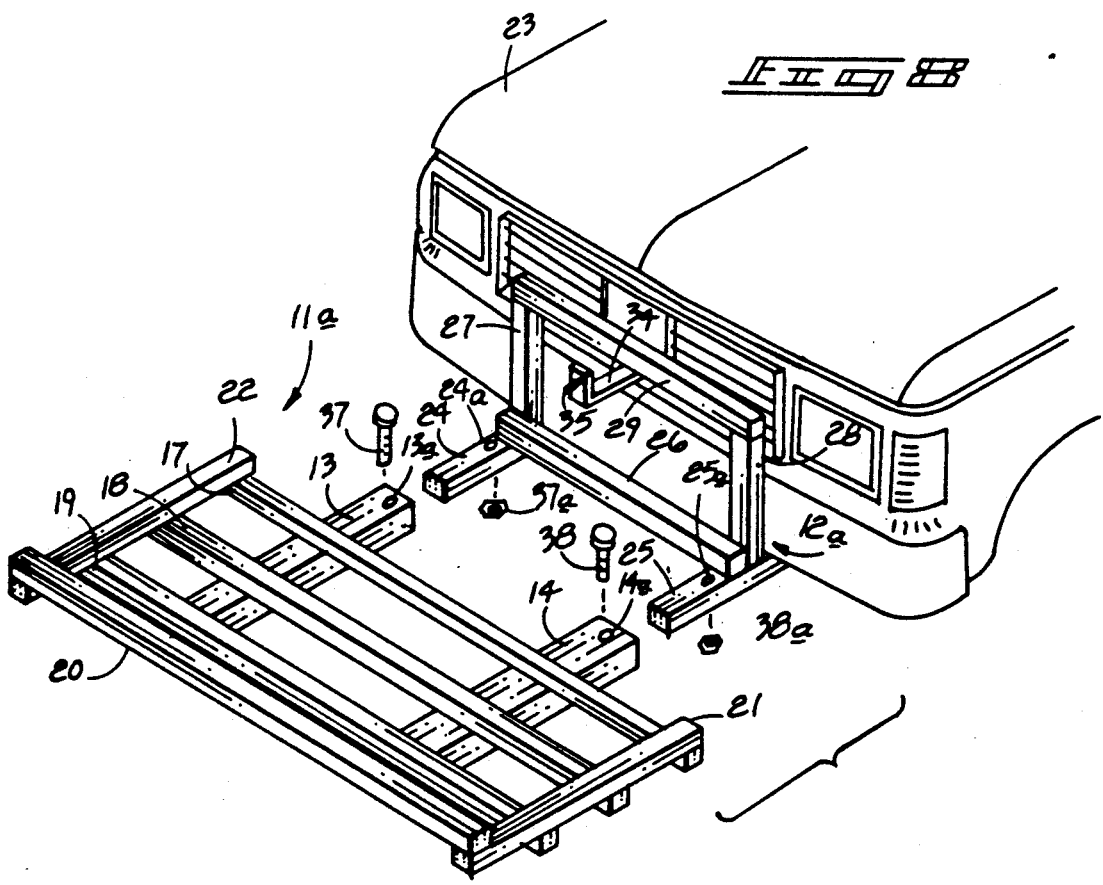

VEHICULAR CARRIER APPARATUS

BACKGROUND OF THE INVENTION

1. Field of the Invention

The field of invention relates to vehicle support structures, and more particularly pertains to a new and improved vehicular carrier apparatus that includes a vertical and horizontal support organization that may be used independently or combination relative to one another.

2. Description of the Prior Art

The use of vehicular supported carrier assemblies are known in the prior art. Heretofore the assemblies have provided various grid works for support of miscellaneous articles thereon, but have been of limited structural integrity and strength for support of various items of enhanced weight in use in environments that are subject to impact. For example, U.S. Pat. No. 3,690,526 to Rundel is illustrative of the prior art utilizing a support grid wherein all of the support braces are in a single plane for support of items positioned rearwardly of a vehicle, as opposed to the rectangular cross-sectional support tubing of the instant invention.

U.S. Pat. No. 3,937,375 to Daniels provides for a unit adapted for securement to a rear bumper cantilevered relative to the rear bumper with chain members securing the item to a bottom edge of the rear bumper as the carrier is supported and cantilevered to a top edge of the bumper.

U.S. Pat. No. 3,560,443 to Haskett sets forth a bumper support organization where again the support grid is provided in a single plane relative to the bumper and is positioned overlying the associated bumper, as opposed to the instant invention wherein the horizontal support grid is positioned essentially underlying or in alignment with the lowermost edge of the bumper.

U.S. Pat. No. 1,906,920 to Sheffer provides a bumper supported framework directed horizontally of the bumper and aligned with a top edge of the bumper, wherein the grid-like framework is arranged in a single plane, as opposed to that of the instant invention.

U.S. Pat. No. 3,521,799 to Rundel provides a carrier framework that is aligned overlying the bumper utilizing strap support members to be directed interiorly of the trunk of the associated vehicle for support of the framework, as opposed to the instant invention relying on securement to the frame of the vehicle for support.

As such, it may be appreciated that there is a continuing need for a new and improved vehicular carrier apparatus which addresses both the problems of ease of use and effectiveness of construction, and as such, the instant invention substantially fulfills this need.

SUMMARY OF THE INVENTION

In view of the foregoing disadvantages inherent in the known types of vehicular support apparatus now present in the prior art, the present invention provides a vehicular carrier apparatus wherein the same utilizes a horizontal and a vertical support carrier utilized independently or in cooperation with one another in association with a forward portion of a motor vehicle. As such, the general purpose of the present invention, which will be described subsequently in greater detail, is to provide a new and improved vehicular carrier apparatus which has all the advantages of the prior art vehicular support apparatus and none of the disadvantages.

To attain this, the vehicular carrier apparatus includes a first and second parallel support beam of equal length for securement to the frame structure of an associated vehicle including a series of three to four equally spaced parallel grid bars secured at each terminal end by an overlying interconnecting bar with an elongate fourth grid bar overlying the interconnecting bars to provide a securement tray, wherein the bar structure is formed of rectangular cross-sectional tubing to provide integrity and rigidity to the organization. A vertical support structure includes spaced elongate bars for securement of the frame structure of the vehicle with upper and lower interconnecting bars spaced from one another by vertical bars, wherein the top interconnecting bar includes a yoke with a threaded boss and connector for receiving and securing a spare tire of the vehicle thereon. The elongate support bars extend forwardly of the bottom interconnecting bar for optionally receiving the support beams of the horizontal support structure thereon.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular carrier apparatus which has all the advantages of the prior art vehicular carrier apparatus and none of the disadvantages.

It is another object of the present invention to provide a new and improved vehicular carrier apparatus which may be easily and efficiently manufactured and marketed.

It is a further object of the present invention to provide a new and improved vehicular carrier apparatus which is of a durable and reliable construction.

An even further object of the present invention is to provide a new and improved vehicular carrier apparatus which is susceptible of a low cost of manufacture with regard to both materials and labor, and which accordingly is then susceptible of low prices of sale to the consuming public, thereby making such vehicular carrier apparatus economically available to the buying public.

Still yet another object of the present invention is to provide a new and improved vehicular carrier apparatus which provides in the apparatuses and methods of the prior art some of the advantages thereof, while simultaneously overcoming some of the disadvantages normally associated therewith.

Still another object of the present invention is tok provide a new and improved vehicular carrier apparatus wherein the same is provided for mounting to a framework of a vehicle and to provide the use of a horizontal or vertical support structure used individually or in combination with one another.

These together with other objects of the invention, along with the various features of novelty which characterize the invention, are pointed out with particularity in the claims annexed to and forming a part of this disclosure. For a better understanding of the invention, its operating advantages and the specific objects attained by its uses, references should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the vertical rack with securement to an associated tire.

FIG. 8 is an isometric illustration of the vertical rack and horizontal rack in securement relative to one another in association with a vehicle.

DESCRIPTION OF THE PREFERRED EMBODIMENT

With reference now to the drawings, and in particular to FIGS. 1 to 8 thereof, a new and improved vehicular carrier apparatus embodying the principles and concepts of the present invention.

Figure 1:
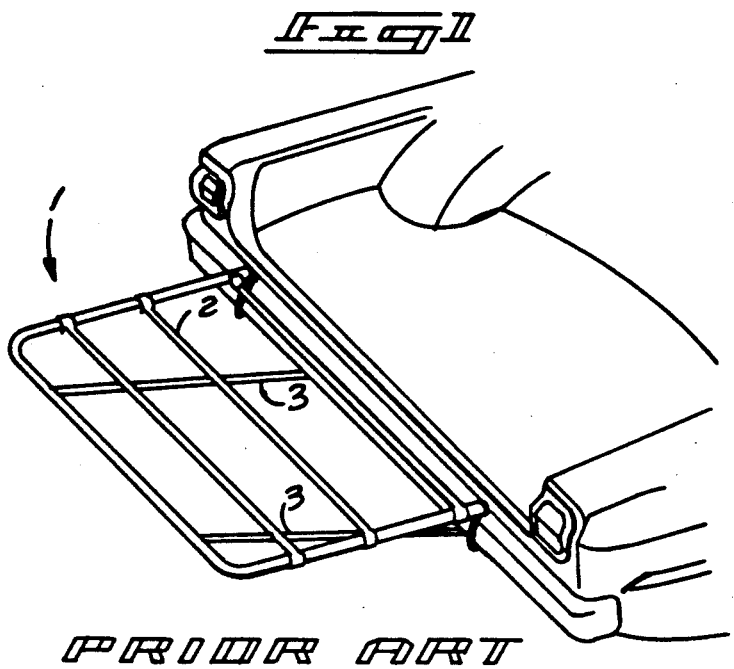
FIG. 1 is an isometric illustration of a prior art vehicular carrier structure.

Reference to FIG. 1 illustrates a prior art carrier rack 1 provided with a tubular upper grid 1, including spaced, tubular supports 3 underlying the grid 2 for securement to a rear bumper of an associated vehicle.

Figure 2:
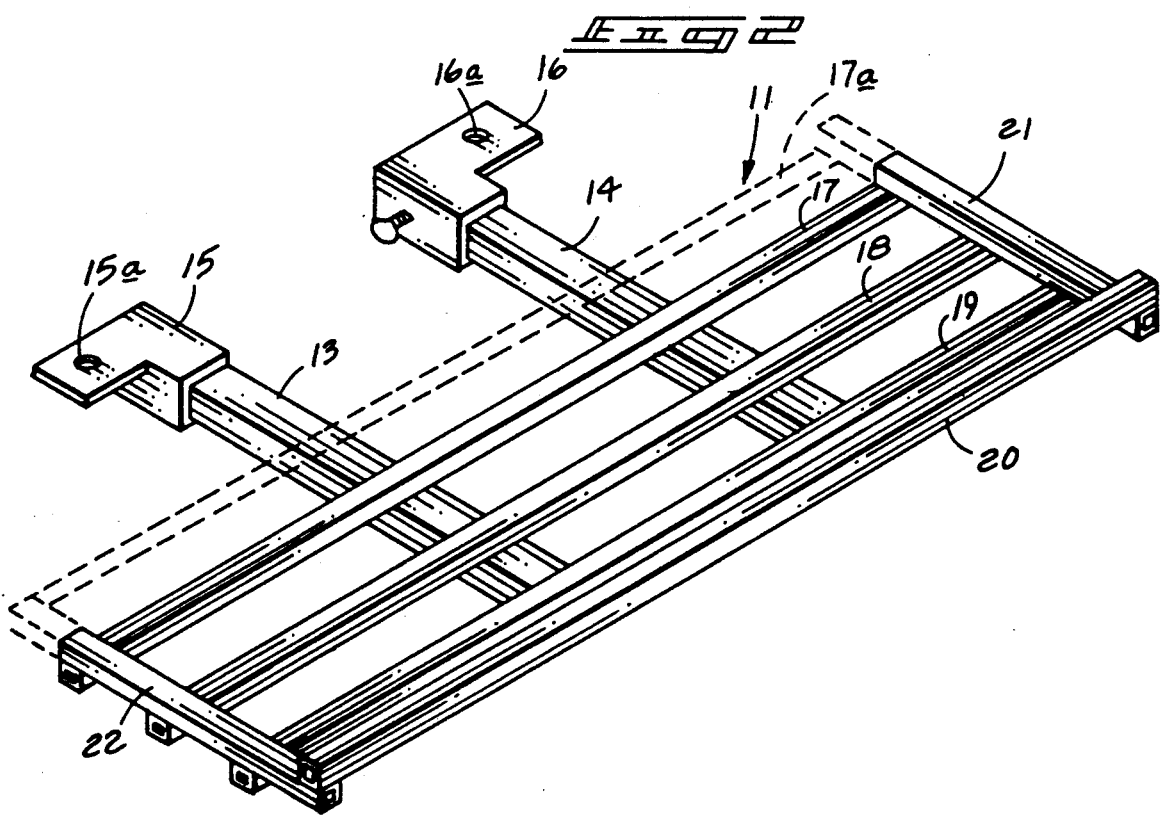
FIG. 2 is an isometric illustration of a horizontal rack as utilized by the instant invention.
Figure 3:
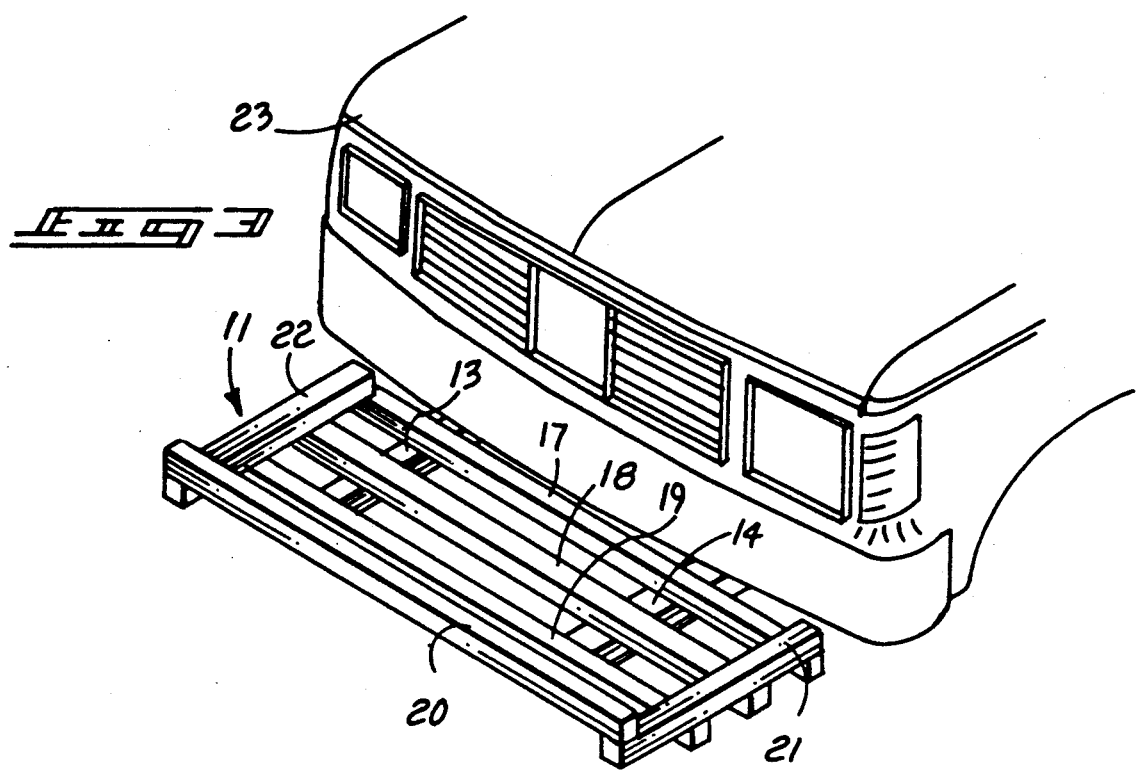
FIG. 3 is an isometric illustration of the horizontal rack of FIG. 2 in association with an associated vehicle.
Figure 5:
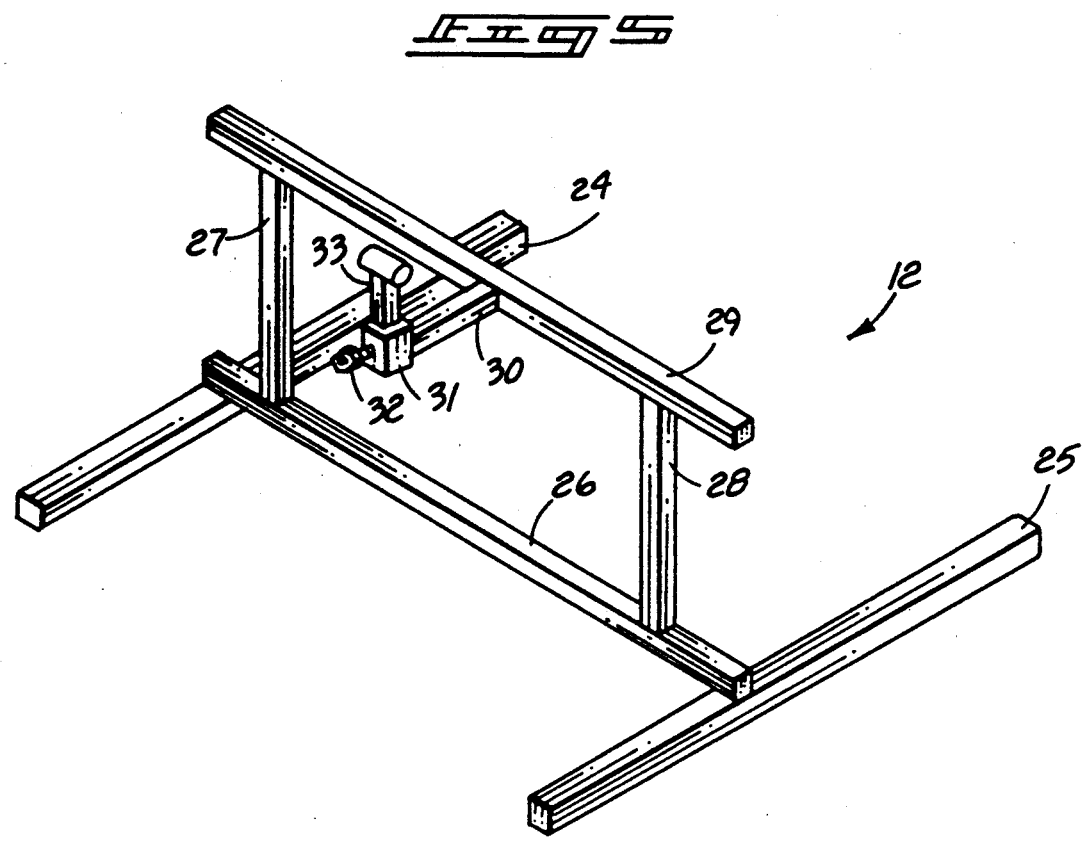
FIG. 5 is an isometric illustration of a vertical rack as utilized by the instant invention.
Figure 6:
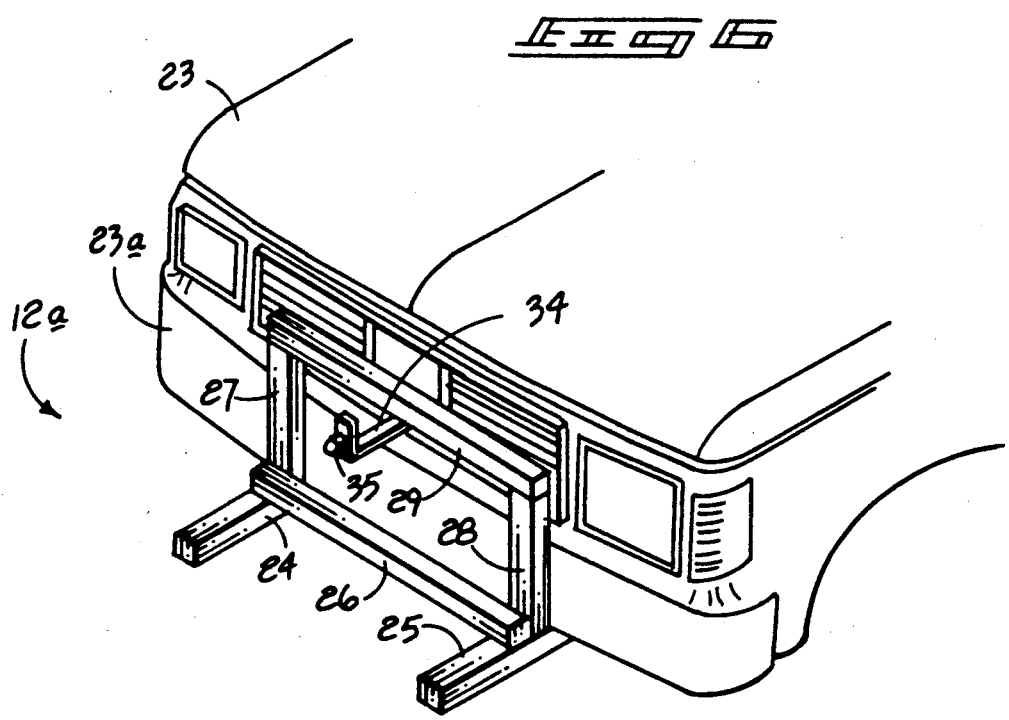
FIG. 6 is an isometric illustration of a vertical rack with a modified tire carrier bracket secured to an associated vehicle.

More specifically, the vehicular carrier apparatus essentially comprises a horizontal rack organization 11, as illustrated in FIG. 2 for example, utilizable individually or in combination with a vertical rack organization 12 or 12a, as illustrated in FIGS. 5 and 6 respectively.

Figure 4:
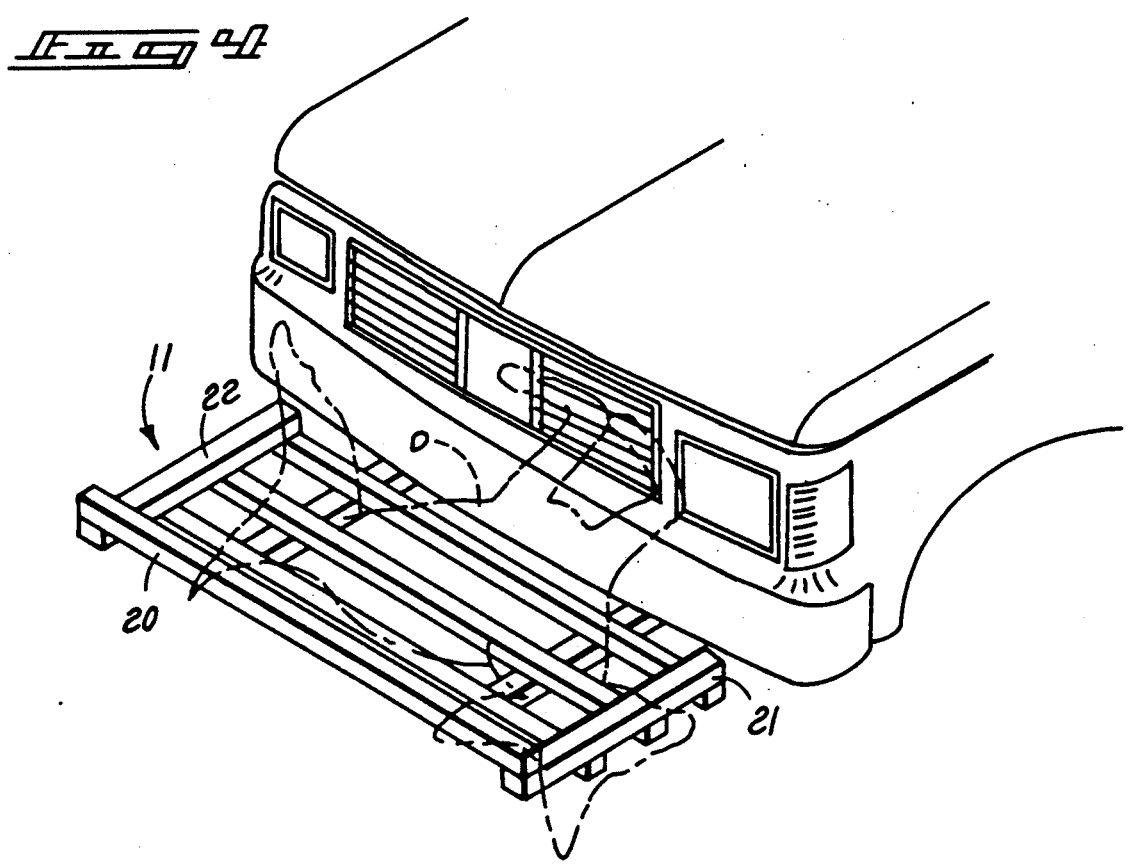
FIG. 4 is a horizontal rack as set forth in FIG. 2 illustrating its load carrying proportions.

The horizontal rack organization 11 includes a first support beam 13 of a predetermined length parallel to and spaced from a second support beam 14, wherein the beams are in general alignment with one another. A first mounting plate 15 and a second mounting plate 16 are mounted to respective rear terminal end of the respective first and second support beams 13 and 14. A series of grid bars overlie and are fixedly mounted to an upper surface of each first and second support beam and extend generally orthogonally to the elongate support beams 13 and 14. The support grid bars include a first support grid bar 17, a second support grid bar 18, and a third support grid bar 19. As illustrated in phantom, a further grid bar 17a may be utilized, wherein it is contemplated at least three such grid bars are to be employed that are directly and fixedly mounted to upper surfaces of the first and second support beams 13 and 14. The grid bars are of an equal length and are spaced a distance equally apart in a parallel aligned relationship relative to one another with a first interconnecting bar 21 and a second interconnecting bar 22 and equally mounted to upper end surfaces of the grid bars 17 through 19. A fourth grid bar 20 is mounted in an overlying relationship relative to forward terminal ends of the first and second interconnecting bars 21 and 22, as illustrated in FIG. 2, to provide a cradle structure for support of various items to be transported, such as a game deer, as illustrated in FIG. 4. The horizontal rack organization 11 is arranged to be secured to the framework of an associated vehicle 23, wherein the first and second support beams 13 and 14 underlie the lower terminal edge of the front bumper 23a of the vehicle 23 to maintain a relatively low profile of the horizontal rack 11 to enable clearance for such items as a winch, a snowplow structure and the like that is typically mounted medially of the front bumper 23a. The first and second support beams are mounted utilizing respective apertures 15a and 16a directed through the mounting plates 15 and 16 for securement to the framework of the associated vehicle 23.

FIG. 5 is illustrative of a vertical organization 12 wherein a right elongate support 24 is spaced and aligned in parallel relationship relative to a left elongate support 25. A bottom interconnecting bar 26 is positioned approximately one-third to one-half interiorly of forward terminal ends of the elongate supports 24 and 25 extending orthogonally relative to upper surfaces of the elongate supports. A right and left vertical bar 27 and 28 are each orthogonally secured to an upper surface of the bottom interconnecting bar 26 positioned somewhat interiorly of the terminal ends of the bottom interconnecting bar 26, with a top interconnecting bar 29 mounted to upper ends of the right and left vertical bars 27 and 28 to position the top interconnecting bar 29 in an overlying parallel relationship relative to the bottom interconnecting bar 26 to again provide adequate clearance on the associated bumper 23a for positioning of winches, snowplows, and the like mounted to the front bumper 23a. A positioning bar 30 is projected forwardly and orthogonally as well as medially of the top interconnecting bar 29, wherein the positioning bar 30 includes a yoke 31 to slidably receive a "T" shaped bar 33, wherein the "T" shaped bar extending upwardly of the yoke 31 is provided for positioning and impingement upon a rear surface of a tire "T" when the threaded boss and connector 32 are secured through an associated wheel rim apertures 36 of the tire "T", as illustrated in FIG. 7 for example. Alternatively, as illustrated in FIG. 6, the positioning bar 30 and its associated structure may be replaced by single "L" shaped bar 34 provided with a threaded boss and connector 35 directed orthogonally and outwardly from a forward vertical leg of the "L" shaped bar 34 that is integrally and orthogonally directed medially from the top interconnecting bar 29.

Reference to FIG. 8 illustrates the association of the vertical and horizontal racks in combination relative to one another wherein support beam apertures 13a and 14a respectively are directed orthogonally through upper and lower surfaces of a respective first and second support beam 13 and 14. The support beams 13 and 14 are of a rectangular, hollow construction and define a rectangular parallelepiped configuration interiorly thereof to receive in a complementary fashion the exterior surfaces of the forward portions of the right and left elongate supports 24 and 25 interiorly thereof. Upon slidingly receiving the right and left supports 24 and 25 interiorly of the first and second support beams 13 and 14, beam apertures 13a and 14a overlie support apertures 24a and 25a when rear terminal ends of the support beams 13 and 14 are in abutment against a forward surface of the bottom interconnecting bar 26 of the vertical rack organization 12 or 12a, as illustrated in FIG. 8. When the apertures 14a, 25a, and 13a, and 24a are in alignment, threaded bolts 37 and 38 are directed through the aligned pairs of apertures and secured by means of associated nut fasteners 37a and 38a to secure the vertical rack to the horizontal rack.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obviousl to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular carrier apparatus for securement to a self-propelled vehicle that includes an elongate bumper member, the apparatus comprising,
   a vertical rack means for securement to the vehicle underlying a bottom edge of the bumper member, the vertical rack means including a right elongate support in an aligned parallel relationship to a left elongate support, and
   an interconnecting bar means positioned rearwardly of respective forward ends of the right and left elongate supports for securement of a vehicular tire member thereto, and
   wherein the interconnecting bar means includes a bottom interconnecting bar secured to upper surfaces of the right and left elongate supports and orthogonally mounted relative to the right and left elongate supports, and further including right and left vertical bars, each of a predetermined length spaced parallel relative to one another and mounted at bottom ends to the bottom interconnecting bar and including a top interconnecting bar mounted to upper ends of the right and left vertical bars, wherein the top interconnecting bar is aligned in an overlying parallel relationship relative to the bottom interconnecting bar, and
   further including a positioning bar having one end connected to the top interconnecting bar and an opposite end terminating in threaded boss and connector member, the positioning bar extending orthogonally forwardly of said top interconnecting bar such that said threaded boss and connector member is mounted for projection through a wheel rim aperture of the vehicular tire member for securing said tire member thereto, and
   including a "T" shaped bar connected to and directed upwardly relative to the positioning bar, wherein the "T" shaped bar is spaced above the threaded boss and connector member for abutment relative to the tire member, and
   including a horizontal rack member removably mounted to the vertical rack means, the horizontal rack member including first and second support beams, each of a predetermined length and spaced in aligned parallel relationship relative to one another, said rack member including a plurality of grid bars mounted upon an upper surface of the first and second support beams, the first and second support beams having first ends removably mounted to the forward ends of said respective right and left elongate supports utilizing a respective fastener to secure the first and second support beams to the respective right and left elongate supports.

2. A vehicular carrier apparatus as set forth in claim 1 wherein the grid bars are each of a yet further predetermined length and spaced of an equal distance relative to one another to the upper surface of each respective first and second support beams and directed orthogonally relative to the first and second support beams.

3. A vehicular carrier apparatus as set forth in claim 2 including a first and second interconnecting bar mounted to respective opposed ends of each of the grid bars and directed orthogonally relative to the grid bars.

4. A vehicular carrier apparatus as set forth in claim 3 including an overlying grid bar mounted parallel to the grid bars and integrally mounted to forward terminal ends of each first and second interconnecting bar to a respective upper surface of each first and second interconnecting bar to overlie the grid bars.

5. A vehicular carrier apparatus as set forth in claim 4 wherein the first and second support beams are defined by a rectangular parallelepiped hollow interior and are of a predetermined cross-sectional configuration to receive slidingly therewithin forward portions of the right and left elongate supports.

6. A vehicular carrier apparatus as set forth in claim 5 wherein the first and second support beams include apertures directed through upper and lower surfaces orthogonally therethrough, and wherein the right and left elongate supports include further apertures directed therethrough for alignment with the apertures, and threaded connector members received through the apertures and further apertures for securing the right and left elongate supports to the first and second support beams.

* * * * *